United States Patent [19]

Christiaens

[11] Patent Number: 5,045,735
[45] Date of Patent: Sep. 3, 1991

[54] DEVICE COMPRISING AN ACTUATOR, METHOD FOR USE IN THE DEVICE, AND SYSTEM FOR CONTROLLING A GAS OR LIQUID FLOW, COMPRISING THE DEVICE

[75] Inventor: Aloïs E. Christiaens, Liederkerke, Belgium

[73] Assignee: N.V. Airpax S.A., Brussels, Belgium

[21] Appl. No.: 442,035

[22] Filed: Nov. 28, 1989

[30] Foreign Application Priority Data

Dec. 23, 1988 [NL] Netherlands .......................... 8803148

[51] Int. Cl.[5] ........................................... H02K 33/12
[52] U.S. Cl. ........................................ 310/38; 310/36; 318/132
[58] Field of Search ................ 310/119, 122; 335/272; 310/36, 38, 156

[56] References Cited

U.S. PATENT DOCUMENTS 3,959,672  5/1976  Walker et al. ...................... 310/36
4,447,793  5/1984  Gray ................................... 310/36

Primary Examiner—Steven L. Stephan
Assistant Examiner—Judson H. Jones

[57] ABSTRACT

A system is disclosed which comprises an electrical actuator (2), a current source (35), a actuating unit (37) having a limited operating range, and a control unit (41). The actuator comprises a first actuator body having two diametrically opposed magnetic poles, and a soft-magnetic second actuator body, which is coaxial with the first actuator body and which preferably comprises three circumferentially equi-spaced teeth, which each carry an energizing coil (29, 30, 31). The first actuator body and the second actuator body cooperate with one another via an air gap and are pivotable relative to each other through a specific angle about a pivotable axis. The control unit is constructed to divide the operating range of the actuating unit into a plurality of sub-ranges and, depending on said sub-ranges, to controllably feed a current through one of the energizing coils, through two of the energizing coils, and through all the energizing coils, respectively.

10 Claims, 3 Drawing Sheets

DEVICE COMPRISING AN ACTUATOR, METHOD FOR USE IN THE DEVICE, AND SYSTEM FOR CONTROLLING A GAS OR LIQUID FLOW, COMPRISING THE DEVICE

BACKGROUND OF THE INVENTION

1. Field of the Invention

The invention relates to a device comprising an electrical actuator, a current source and an actuating unit, which actuator comprises a first actuator body having two diametrally opposed magnetic poles, and a soft-magnetic second actuator body which is coaxial with the first actuator body and which comprises at least three circumferentially equi-spaced teeth, each provided with an energizing coil, the first actuator body and the second actuator body cooperating with each other via an air gap and being pivotable through an angle relative to one another about a pivotal axis.

2. Art Background

A device, of the type referred to above, is known from U.S. Pat. No. 4,447,793 (herewith incorporated by reference) and has an actuator comprising a circularly cylindrical stator surrounding a non-circularly cylindrical rotor having a north pole and a diametrally opposed south pole. The stator comprises a stator body having three stator teeth and three energizing coils. The stator teeth, which extend in radial directions relative to the rotor, form angles of 120° between them and have curved tooth surfaces, a narrow passage being formed between every two adjacent tooth surfaces. Together with the poles of the rotor, which is flattened at opposite sides of the poles, the tooth surfaces define an air gap.

The energizing coils arranged around the actuator teeth of the known device each comprise two bifilar windings and a single third winding. The enrgizing coils are coupled to a d.c. source via a change-over switch, to energize one of the bifilar windings and the non-bifilar winding at the same time. This energizing method results in two stable rotor positions.

The actuator of the known device has a torque-angle characteristic which is such that the rotor torque is maximal midway between the two stable positions and is minimal in the two stable positions. As a result of this, the known device is suitable for the actuation of a switch having two discrete positions, as is stated in said U.S. Patent Specification, but the known device gives rise to problems if it is used in a control system in which a control member is to be set continuously and in a well-defined manner to any operating point situated between an initial position and an end position, as for example in the case of a control valve which is pivotable through an angle of for example 90° in a gas or liquid filled system.

Another drawback of the known actuator is that in order to combat detent torques, the tooth surfaces have tangential dimensions which are so large that arranging the coils around the teeth during manufacture of the actuator is complicated as a result of the small amount of space available between the adjacent tooth surfaces. A further disadvantage is that the stator body is made up of various parts.

SUMMARY OF THE INVENTION

It is an object of the invention to provide a device of the type defined in the opening paragraph which enables a control member of a control system to be set to any position within its control range in an accurately defined manner. Moreover, the invention aims at constructing the actuator of the device in such a way that it is largely free from detent torques and can be of a simple and robust construction.

To this end the invention is characterized in that the actuating unit of the device has a limited operating range and the device comprises a control unit for dividing the operating range of the actuating unit into a plurality of sub-ranges, and depending upon said sub-ranges, controllably feeding a current through one of the energizing coils, through at least two but not all the energizing coils, and through all the energizing coils, respectively.

An advantage of the device in accordance with the invention is that it enables the torque-angle characteristics of the actuator to be utilized for positioning a control member of a control unit in such a way that the control member can be set unambiguously to all positions of its control range. If the load of the control member increases as a function of the displacement of the control member, the device in accordance with the invention also enables the torque to be increased as a function of the displacement, so that in an end position of the control member a comparatively large torque is available, enabling said end position to be reached with a minimal power.

An embodiment of the device in accordance with the invention, in which the number of teeth and the number of energizing coils of the actuator is three, is characterized in that the number of sub-ranges is three. In this device the actuator has three distinctly different torque-angle characteristics. Since the control unit divides the operating range of the actuating unit into three sub-ranges an optimum use can be made of said characteristics when the appropriate current is successively fed through one energizing coil, two energizing coils and three energizing coils.

Another embodiment of the device, in which the detent torque of the actuator is drastically minimized, is characterized in that the first actuator body of the actuator is at least substantially circularly cylindrical and is diametrally magnetized. The sinusoidal variation of the magnetic field around the first actuator body of this construction in conjunction with the rotational symmetry of the second actuator body assists in preventing detent torques.

Generally, the actuator will be a three-phase electromagnetic drive unit, in which for practical reasons the first actuator body of the actuator will preferably be a pivotable body. Obviously, the second actuator body then functions as a stator body.

The invention further relates to a method which can be used successfully in the device in accordance with the invention. The method in accordance with the invention is characterized in that in passing through the operating range of the actuating unit the control unit feeds the current successively through a first one of the energizing coils; through said first coil and at least one of the further coils but not all the coils, and through all the energizing coils. Preferably, the device in accordance with the invention comprises an actuator having three teeth and three energizing coils. The current is then fed in succession through the first one of the energizing coils, through said first coil and at least one of the two other coils, and through all the energizing coils.

An advantage of the inventive method is that an optimum use is made of the torque-angle characteristics of the actuator, to traverse the entire operating range of a control member driven by the actuator with a comparatively low average electric input power. This has the additional advantage of a minimal heat dissipation in the energizing coils, which is of particular importance for uses in high-temperature environments.

The invention further relates to a system for the well-defined control of the flow rate of a gaseous or liquid medium, comprising a control unit which comprises a control member which is rotatable through a limited angle about an axis of rotation, and the device in accordance with the invention, the control member being mechanically coupled to an actuator shaft of the actuator. The control member may be coupled directly, for example mechanically, to the actuator shaft, the angle through which the actuator shaft is operative corresponding to the movement, for example a pivotal movement, of the control member. Preferably, the control member will be positioned in such a way relative to the actuator shaft that in the end position of the control member the actuator still produces a large torque.

BRIEF DESCRIPTION OF THE DRAWINGS

The invention will now be described in more detail, by way of example, with reference to the accompanying drawings in which.

DETAILED DESCRIPTION

Figure 1:
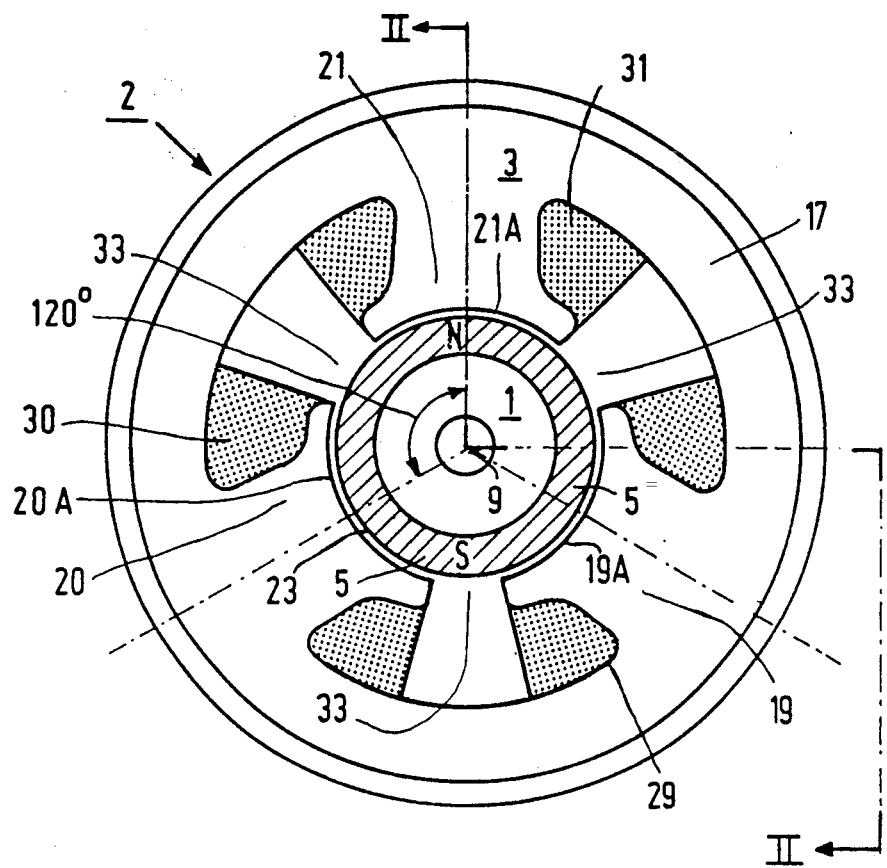
FIG. 1 is a cross-sectional view of an embodiment of the actuator of the device in accordance with the invention.
Figure 2:
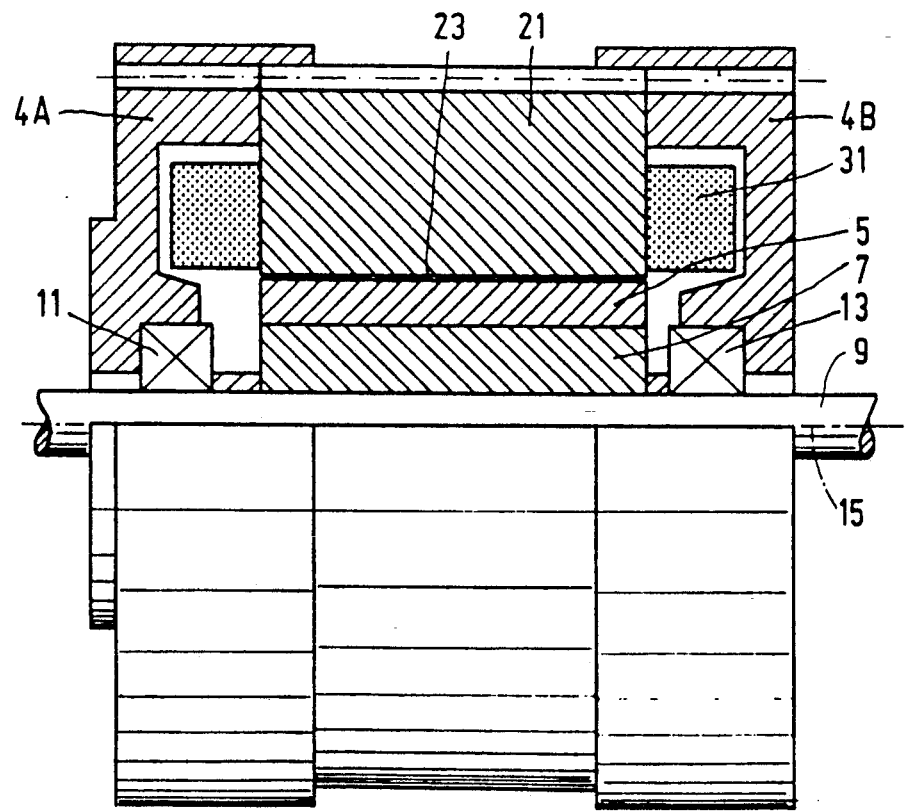
FIG. 2 is a longitudinal sectional view, partly an elevational view, taken on the line II—II in FIG. 1.

The actuator 2 of the device in accordance with the invention shown in FIG. 1 comprises a first actuator body 1, a second actuator body 3 and a housing 4A and 4B. The first actuator body 1 comprises a cylindrical diametrally magnetized pivotable permanent-magnet body 5 having a north pole N and a south pole S. The pivotal body 5 is mounted on an actuator shaft 9 by means of a soft-magnetic sleeve 7, for example made of sintered iron, which shaft is supported in two bearings 11 and 13 and is pivotable relative to the second actuator body 3 about a pivotable axis 15. The second actuator body 3 comprises a stator body 17 having three radially inwardly directed teeth 19, 20 and 21 of sintered iron which, in order to combat detent torques, are preferably identical to one another. If desired, the stator body 17 can also be manufactured in a different manner, for example by stacking laminations to form one lamination assembly.

The teeth 19, 20 and 21, hereinafter referred to as stator teeth, each have a curved tooth surface 19A, 20A and 21A respectively. The tooth surfaces are all situated on the same circularly cylindrical imaginary surface and define an air gap 23 relative to the pivotable body 5. The three stator teeth 19, 20 and 21 are of identical shape and dimensions and have central axes which are disposed at angles of 120° relative to each other, so that the stator body 17 may be regarded as an actuator part which is at least internally rotationally symmetrical. This inter alia enables the tangential passages 33 between the tooth surfaces 19A, 20A and 21A to be comparatively large. In the present example the tangential dimension of each of the tooth surfaces is approximately a quarter of the circumferential length of said cylindrical imaginary surface.

Each of the three stator teeth 19, 20 and 21 is provided with an energizing coil 29, 30 and 31 respectively. The coils 29, 30 and 31 comprise a plurality of turns arranged around the teeth 19, 20 and 21 and each have coil leads, not shown, which are electrically connected to a current source 35 (see FIG. 3). Since the passages 33 between the teeth are comparatively large the teeth 19, 20 and 21 can simply be provided with said coils.

Figure 3:
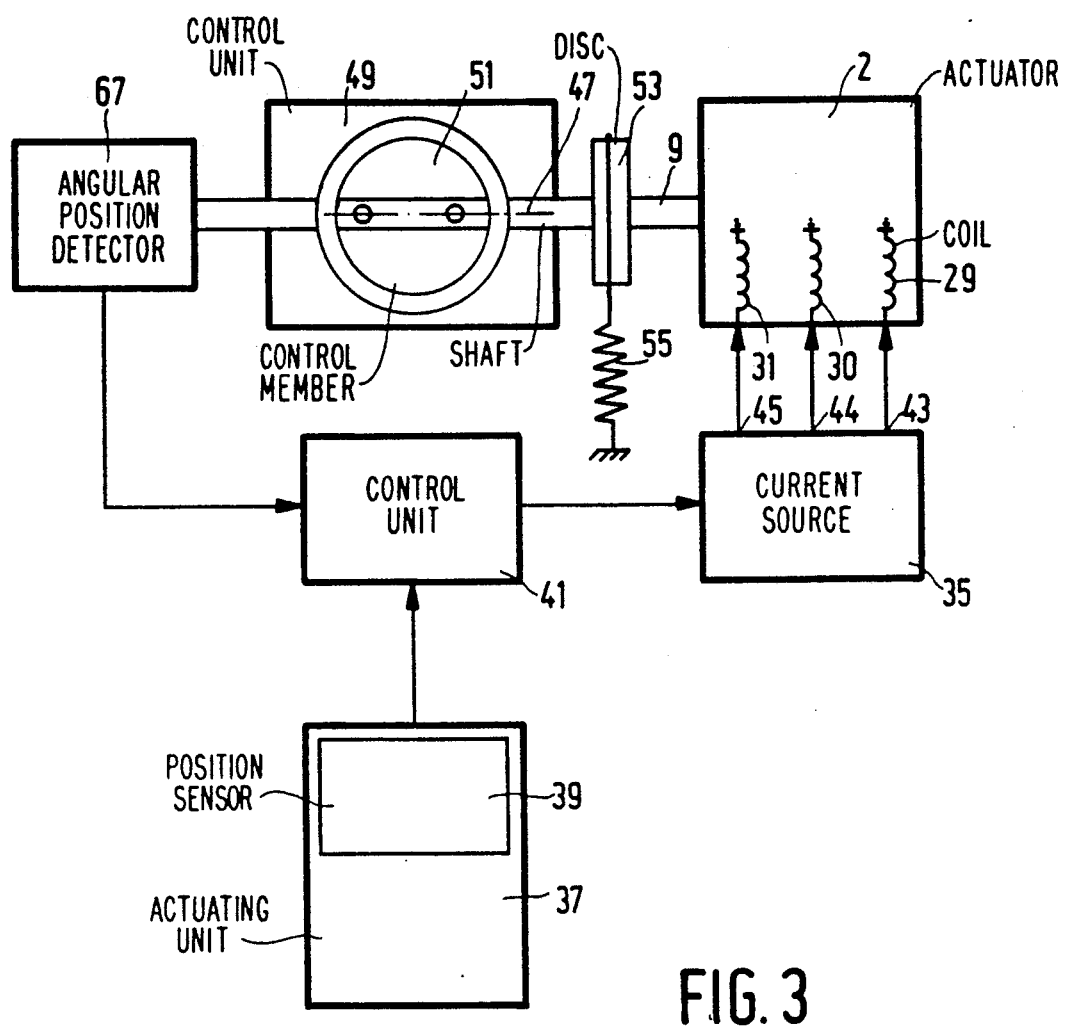
FIG. 3 shows diagrammatically an embodiment of the system in accordance with the invention.

The system in accordance with the invention shown in FIG. 3 can be used, for example, in motor cars for controlling a throttle in a carburetor. The system comprises an actuating unit 37 having an actuating member, for example an accelerator pedal of a motor car, and a position sensor 39. The position sensor 39 may comprise, for example, a potentiometer whose output signal is a function of the position of the actuating member in its operating range. The system further comprises a control unit 41, for example a microprocessor, which is electrically coupled to the actuating unit 37 and which is electrically coupled to the current source 35. The current source 35 is electrically coupled to the energizing coils 29, 30 and 31 of the actuator 2. For this purpose the current source 35 comprises three independent outputs 43, 44 and 45, for separately applying a controllable current to each coil 29, 30 and 31. The actuator shaft 9 of the actuator 2 is mechanically coupled to a shaft 47 of a control unit 49. The shaft 47 carries a control member 51, for example a valve. In the present example the shaft 47 carries a disc 53, which is connected to a tension spring 55. The tension spring 55 ensures inter alia that the control member 51 occupies a well-defined initial or rest position when the actuator 2 is not energized.

The operation of the system in accordance with the invention will now be described hereinafter.

Figure 4:
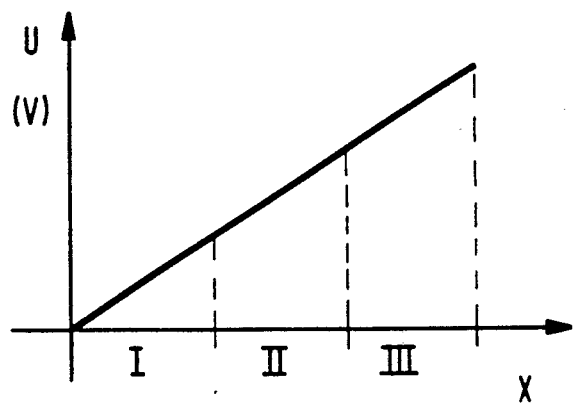
FIG. 4 is a graph representing the output signal of the actuating unit of the system shown in FIG. 3 as a function of the position in its operating range.

When the actuating member of the actuating unit 37 is actuated the control unit 41 receives a signal from the position sensor 39. The control unit is programmed in such a way that the operating range of the actuating unit is divided into three sub-ranges, for example as shown in the graph in FIG. 4, in which the sub-ranges are referenced I, II and III. The control unit 41 controls the current source 35 as a function of the three sub-ranges, for example as is illustrated in FIG. 5.

Figure 5:
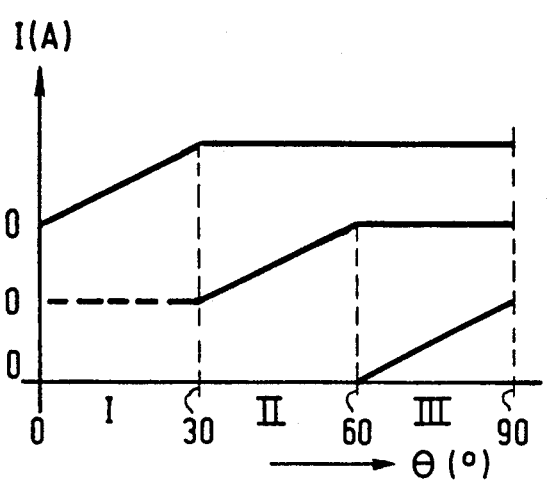
FIG. 5 is a graph representing the average current in each energizing coil of the actuator as a function of the position in the operating range of the actuating unit of the system shown in FIG. 3.

As is shown in FIG. 5 an energizing coil, for example the coil 29, is energized in the sub-range I, the current increasing proportionally to a maximum value at the transition from the first sub-range I to the second sub-range II. This current remains constant in the remainder of the operating range. In the sub-range II a second energizing coil, for example the coil 30, is energized proportionally to the same constant value at the transition from the sub-range II to the sub-range III, after which the current remains constant. In the sub-range III the energizing coil 31 is also energized proportionally.

The torque-angle characteristic for the maximum current strength, hereinafter referred to as the maximum torque-angle characteristic, of each energizing coil 29, 30 and 31 is represented by vectors 59, 60 and 61 respectively in FIG. 6. The lengths of the vectors correspond to the maximum torques in the torque-angle characteristics and the directions of the vectors correspond to the positions where the torque having a value zero is unstable. In FIG. 7 this position is indicated by the numeral 63 for the maximum torque-angle characteristic (59) of the coil 29.

Figure 6:
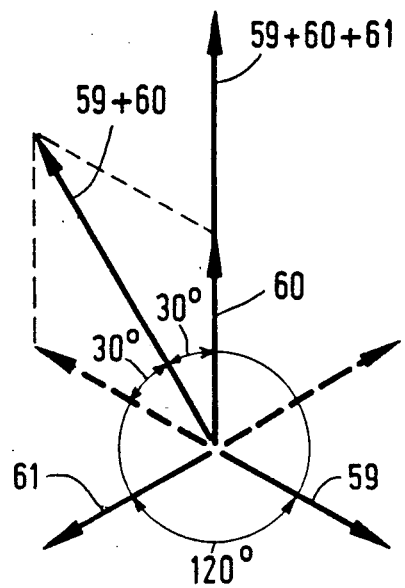
FIG. 6 is a vector diagram representing the torque which can be delivered by the actuator shown in FIG. 1 when one, two or three coils are energized respectively.
Figure 7:
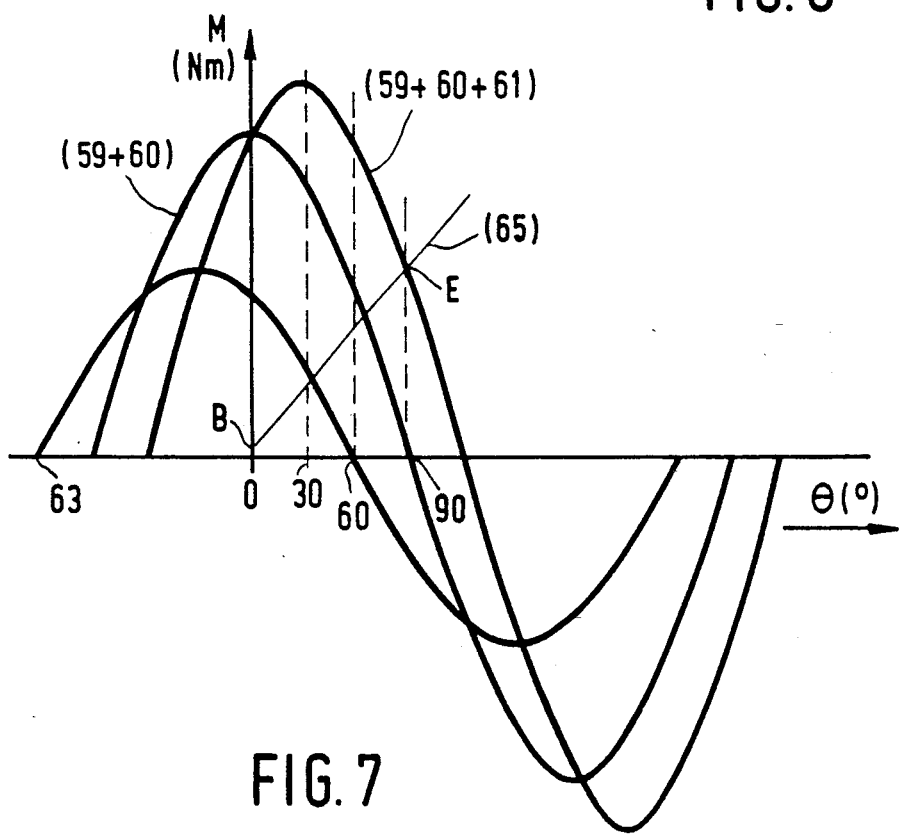
FIG. 7 shows the three maximum torque-angle characteristics of the actuator and the torque-angle characteristic of a load.

By feeding the energizing current through the coils 29, 30 and 31 as already described with reference to FIG. 5 and by a suitable combination of the vectors, as is illustrated in FIG. 6, the three maximum torque-angle characteristics (59), (59+60) and (59+60+61) are obtained, which are phase-shifted relative to one another. In the present example the shift is up to 30°.

FIG. 7 also shows the torque-angle characteristic (65) of the load of the control unit 49. The torque-angle characteristics (59), (60+61) and (59+60+61) obtained by means of the device in accordance with the invention enable well-defined positions of equilibrium to be attained, which positions are situated between the initial position B and the end position E of the control member 51. In the present example the control member 51 rotates through an angle of 90° between its initial position B and its end position E.

In order to guarantee that a control member of a control unit is correctly coupled to the actuator shaft of the actuator, the actuator may be provided with mechanical stops to limit the rotary movement of the rotary shaft.

In order to form a closed control circuit the system in accordance with the invention may comprise an angular-position detector 67, which is, for example, mechanically coupled to the shaft 47 (see FIG. 3). The angular-position detector 67 supplies a signal which is a function of the position of the control member 51. The angular-position detector 67 is electrically coupled to the control unit 41, enabling small deviations from the desired valve position to be corrected.

It is obvious that the invention is not limited to the embodiments disclosed herein and the field of use mentioned herein.

I claim:

1. A device comprising
an electrical actuator,
a current source, and
an actuating unit, which actuator comprises
a first actuator body having two diametrally opposed magnetic poles, and
a soft-magnetic second actuator body which is coaxial with the first actuator body and which comprises at least three circumferentially equi-spaced teeth, each provided with an energizing coil, the first actuator body and the second actuator body cooperating with each other via an air gap and being pivotable through an angle relative to one another about a pivotal axis, characterized in that the actuating unit has a limited operating range, and the device comprises a control unit for dividing the operating range of the actuating unit into a plurality of sub-ranges and, depending on said sub-ranges, controllably feeding a current through one of the energizing coils, through at least two but not all the energizing coils, and through all the energizing coils, respectively.

2. A system comprising:
an actuating unit including a movable actuating member and position sensing means for sensing the position of said actuating member and producing a corresponding electrical signal;
an electrical actuator comprising a first actuator body having two substantially diametrally opposed magnetic poles and a soft-magnetic second actuator body which encircles, is substantially coaxial with, and is separated by an air gap from, said first actuator body, said second actuator body including at least first, second and third circumferentially, substantially equi-spaced teeth, said teeth including, respectively, first, second and third energizing coils, said first actuator body being pivotable, about a pivot axis, relative to said second actuator body; and
a current source which is in electrical communication with both said actuating unit and said electrical actuator,
characterized in that
said actuating unit is characterized by a finite operating range, and
said system further comprises control means, in electrical communication with said actuating unit and said current source, for dividing said operating range into a plurality of sub-ranges and, depending upon the desired sub-range, controllably feeding current from said current source into said first energizing coil, into at least said first and second energizing coils but less than all of the energizing coils, or into said first, second and third energizing coils.

3. A system as claimed in claim 2, further comprising a control member which is mechanically coupled to said first actuator body.

4. A system as claimed in claim 3, wherein said control member includes a valve.

5. A system as claimed in claim 3, further comprising means, mechanically coupled to said control member and in electrical communication with said control means, for sensing a position of said control member and producing a corresponding electrical signal.

6. A system as claimed in claim 2, wherein said control means includes a microprocessor.

7. A system as claimed in claim 6, in which the number of teeth and the number of energizing coils of the actuator is three, characterized in that the number of sub-ranges is three.

8. A system as claimed in claim 6, characterized in that the first actuator body of the actuator is at least substantially circularly cylindrical and is diametrally magnetized.

9. A system as claimed in claim 6, characterized in that the first actuator body of the actuator is constructed as a pivotable body and the second actuator body is constructed as a stator body having stator teeth.

10. A system as claimed in claim 7, characterized in that the actuator is a three-phase electromagnetic drive unit.

* * * * *